United States Patent
Becoulet et al.

(10) Patent No.: US 10,968,770 B2
(45) Date of Patent: Apr. 6, 2021

(54) AXIAL RETENTION OF A FAN SHAFT IN A GAS TURBINE ENGINE

(71) Applicant: SAFRAN AIRCRAFT ENGINES, Paris (FR)

(72) Inventors: Julien Fabien Patrick Becoulet, Moissy-Cramayel (FR); Michel Gilbert Roland Brault, Moissy-Cramayel (FR); Romain Guillaume Cuvillier, Moissy-Cramayel (FR); Arnaud Nicolas Negri, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 100 days.

(21) Appl. No.: 16/141,516

(22) Filed: Sep. 25, 2018

(65) Prior Publication Data
US 2019/0093504 A1    Mar. 28, 2019

(30) Foreign Application Priority Data

Sep. 25, 2017    (FR) .................................... 17 58820

(51) Int. Cl.
*F01D 21/04* (2006.01)
*F04D 29/051* (2006.01)
(Continued)

(52) U.S. Cl.
CPC .......... *F01D 21/045* (2013.01); *F01D 21/04* (2013.01); *F04D 29/051* (2013.01); *F04D 29/056* (2013.01); *F04D 29/063* (2013.01); *F04D 29/102* (2013.01); *F05D 2220/36* (2013.01); *F05D 2240/55* (2013.01);
(Continued)

(58) Field of Classification Search
CPC .............................. F01D 21/045; F01D 21/04
See application file for complete search history.

(56) References Cited

U.S. PATENT DOCUMENTS

| 7,316,538 B2 | 1/2008 | Bouchy et al. |
| 7,322,180 B2 | 1/2008 | Lapergue et al. |

(Continued)

FOREIGN PATENT DOCUMENTS

| EP | 2846005 A2 | 3/2015 |
| FR | 2866068 A1 | 8/2005 |

(Continued)

OTHER PUBLICATIONS

Search Report Under Section 17(5), dated Mar. 15, 2019, issued in corresponding GB Application No. 1815493.0, 3 pages.
(Continued)

*Primary Examiner* — Juan G Flores
(74) *Attorney, Agent, or Firm* — Christensen O'Connor Johnson Kindness PLLC (57) ABSTRACT

A gas turbine engine includes a fan driven by a fan shaft and retractable axial retainer of the shaft mounted on a stator element and movable between a first operational position and a second non-operational position. The retractable axial retainer may include a fluid supply configured for supplying at least one cavity with fluid. In some examples, the retractable axial retainer is mounted movably or slidingly so as to generate movement of the retractable axial retainer between the operation and non-operational positions.

20 Claims, 4 Drawing Sheets

(51) Int. Cl.
*F04D 29/056* (2006.01)
*F04D 29/063* (2006.01)
*F04D 29/10* (2006.01)

(52) U.S. Cl.
CPC ...... *F05D 2240/60* (2013.01); *F05D 2260/30* (2013.01); *F05D 2260/52* (2013.01); *F05D 2260/57* (2013.01); *F05D 2260/98* (2013.01)

(56) References Cited

U.S. PATENT DOCUMENTS

| | | |
|---|---|---|
| 7,322,181 B2 | 1/2008 | Lapergue et al. |
| 8,721,256 B2 | 5/2014 | Servant |
| 9,341,116 B2 * | 5/2016 | Gerez .................. F01D 21/045 |
| 2013/0022448 A1 | 1/2013 | Jadczak et al. |
| 2013/0186056 A1 | 7/2013 | Gerez et al. |
| 2015/0063986 A1 | 3/2015 | Sasse et al. |
| 2019/0009887 A1 | 1/2019 | Yvon et al. |

FOREIGN PATENT DOCUMENTS

| | | |
|---|---|---|
| FR | 2866069 A1 | 8/2005 |
| FR | 2877046 A1 | 4/2006 |
| FR | 2955895 A1 | 8/2011 |
| FR | 2965298 A1 | 3/2012 |
| GB | 2058245 A | 4/1981 |
| WO | 2017/118810 A1 | 7/2017 |

OTHER PUBLICATIONS

Rapport de Recherche Préliminaire, mailed Jun. 5, 2018, issued in corresponding French Application No. 1758820, filed Sep. 25, 2017, 2 pages.

* cited by examiner

AXIAL RETENTION OF A FAN SHAFT IN A GAS TURBINE ENGINE

TECHNICAL FIELD

Embodiments of the present disclosure relate to a gas turbine engine comprising an axial retainer, or axial retention means, for the fan shaft thereof, in particular in case of the latter breaking.

BACKGROUND

The state of the art comprises, for example, French patent documents FR-A1-2 866 068, FR-A1-2 866 069, FR-A1-2 955 895, FR-A1-2 877 046 and FR-A1-2 965 298, the disclosures of which are incorporated by reference.

In an emergency situation, it is necessary to protect the engine so that the aircraft can be diverted towards the closest airport. In case of partial or total loss of a fan blade, the fan is unbalanced and oscillates. This condition is known to a person skilled in the art as "orbiting of the fan". These oscillations generate significant forces. To guarantee safety, the forces during the sizing of the engine and aeroplane structures must be considered, which makes the engine heavier with respect to a standard engine which is only designed to support the forces during normal flights.

To limit the dynamic loads of the fan and to lighten the engine, a decoupling device which makes it possible to limit high-speed forces is known through patent application FR-A1-2 877 046, which is incorporated by reference in its entirety. In practice, for a turbofan engine body comprising a low-pressure shaft and a high-pressure shaft, the decoupling system is arranged to decouple the bearings which support the low-pressure shaft for driving the fan with respect to the intermediate casing, these bearings being known to a person skilled in the art as "bearing 1" and "bearing 2".

After decoupling the fan, the modal situation of the engine is called "hypercritical", the only functioning mode of the engine is thus low-speed. Advantageously, the dynamic loads of the fixed structures are thus highly reduced at high speed. At high speed, the dynamic loads in the shaft remain significant and the risk of breaking the low-pressure drive shaft increases.

Figure 1:
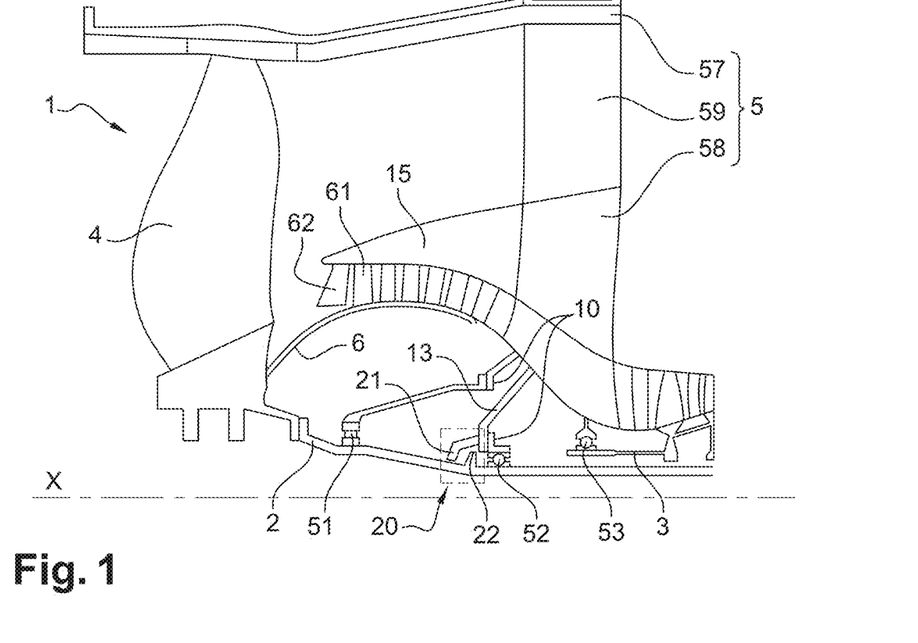
FIG. 1 is an axial schematic, cross-section half-view of a gas turbine engine, without reduction gear.

Referring to FIG. 1, a twin spool turbofan engine 1 is shown comprising a low-pressure shaft 2 rigidly connected to a fan 4 and a high-pressure shaft 3 rotating around an axis X of the engine. Subsequently, the terms "upstream" and "downstream" are defined with respect to the circulation of gases in the engine, the gases circulating from upstream to downstream. Likewise, by convention in the present application, the terms "inner" and "outer" are defined radially with respect to the axis X of the engine represented in FIG. 1. Thus, a cylinder extending along the axis of the engine comprises an inner face turned towards the axis of the engine and an outer surface, opposite the inner surface thereof.

Still referring to FIG. 1, the low-pressure shaft 2 is guided in rotation in an intermediate casing 5 of the engine 1 by the bearings 51, 52. As shown in FIG. 1, the intermediate casing 5 comprises an outer ferrule 57 and an inner axle 58 connected by the structural arms 59. The high-pressure shaft 3 is guided in rotation in the intermediate casing 5 of the engine 1 by a bearing 53.

As shown in FIG. 1, the engine 1 comprises a separating casing 15, also called "separating nozzle", rigidly connected to the axle 58 of the intermediate casing 5, arranged to internally guide a primary flow and externally, a secondary flow. The engine 1 further comprises a low-pressure compressor, known to a person skilled in the art under the name thereof, "booster", which comprises stator blades 62 rigidly connected to the separating casing 15 and mobile blades 61 rigidly connected to a drive drum 6 to compress the primary flow circulating upstream to downstream in the engine 1. A decoupling device 10 is disposed between the axle 58 of the intermediate casing 5 and the bearings 51, 52 in order to loosen the structure of the engine in hypercritical mode as explained above.

In case of breakage of the low-pressure shaft 2 downstream from the bearing 52 and failure of the bearing 52, a catcher device 20 is provided, known as a "catcher", which makes it possible to axially retain the downstream part of the low-pressure shaft 2 rigidly connected to the fan 4. This catcher device 20 comprises, on the one hand, a ferrule 21 extending radially towards the inside from the axle 58 of the intermediate casing 5 and, on the other hand, an annular ring 22 extending radially towards the outside from the low-pressure shaft 2. Thus, in case of breakage of the low-pressure shaft 2 downstream of the bearing 52, the part of the low-pressure shaft 2 situated upstream of the breaking zone is moved towards upstream, if the annular ring 22 comes into contact with the ferrule 21 to retain it axially. In other words, the upstream part of the low-pressure shaft 2 is "caught" by the catcher device 20 in case of breakage of the low-pressure shaft 2.

Such a catcher device 20 is satisfactory in case of breakage of the low-pressure shaft 2 downstream of the bearing 52 but is ineffective in case of breakage upstream of the bearing 52.

In the fortunately highly improbable case of the shaft breaking downstream of the bearing 52, the low-pressure compressor can assist the user in retaining the fan when these two members are rigidly connected. If a system common to machines with and without a reduction gear or for a turbine engine where the low-pressure compressor is not connected to the fan shaft is sought to be produced, a new solution must however be found that does not require the low-pressure compressor.

In order to remove at least some of the disadvantages cited above, axial retention means have already been proposed in pending application FR-A1-2 965 298, arranged to come into contact with the drive drum and the fan so as to prevent an axial movement of this drum in case of the shaft 2 breaking upstream of the bearing 52. Pending application FR-A1-2 965 298 is incorporated by reference in its entirety.

Thus, the drive shaft is axially retained, indirectly, via the integral drive drum of the fan. The retention means make it possible to catch the whole "drum-fan-low-pressure shaft" reliably, the breaking zone of the drive shaft being unimportant. Thus, even if the shaft breaks in the immediate proximity of the fan, the fan is not ejected upstream, but retained by the drum. The above-mentioned disadvantages of the prior art are thus removed.

However, the zone of the engine wherein the retention means are installed is generally obstructed and it can prove to be difficult to assemble these means here. It is particularly the case of a reduction gear engine, of which the fan shaft is driven by a low-pressure shaft by way of a reduction gear, for example, of the epicycloidal type. In order to ensure the correct functioning of this reduction gear, it is necessary to limit the axial movements of the shafts. That is why thrust bearings 52, 53 (generally ball bearings) are used for the input and output shafts of the reduction gear.

In the state of the art, there are no retention means particularly configured for a reduction gear engine.

SUMMARY

Embodiments of the present disclosure provide an improvement to the current technology which is simple, effective and economical. The aim of the disclosure is to axially retain the fan in case of the shaft thereof or the thrust bearing 52 breaking in the specific case above.

Embodiments of the disclosure provide a gas turbine engine, comprising a fan driven by a fan shaft and a retractable axial retainer, or retention means, of the shaft mounted on a stator element and mobile between a first operational position and a second non-operational position. The retractable axial retainer comprises a fluid supply or other means for supplying fluid from at least one cavity. In some embodiments, the retractable axial retainer is slidingly mounted, so as to generate the movement thereof between the positions.

The disclosure thus proposes causing the movement of the axial retainer, from the non-operational position thereof to the operational position thereof, using the fluid. The fluid supply up to the cavity for assembling the retention means can be relatively simple and barely obstructive, which facilitates the integration in a reduction gear engine. Pressurization can only be activated when the engine is turned on. It is thus understood, that the retention means can only be in an operational position when the engine is turned on and can be in a non-operational position when the engine is turned off. The retention means are advantageously configured to not impede the axial assembly and disassembly of the fan, when they are in the non-operational position thereof.

An engine according to embodiments of the disclosure can comprise one or more of the following characteristics, taken individually or combined with one another:
- the fluid is pressurised air or oil;
- the retention means comprising at least one finger mobile between the positions, in a substantially radial direction with respect to an axis of rotation of the fan shaft;
- the finger has a general parallelepiped or cylindrical shape;
- the finger is biased into the non-operational position thereof by a spring, biasing member or other elastic return means;
- the stator element is a bearing support;
- the bearing support comprises a truncated downstream part and an upstream cylindrical part which surrounds a rolling bearing and comprises, at the outer periphery thereof, the at least one cavity;
- the cylindrical part is surrounded by a downstream part of a fan disc;
- the engine comprises a pressure supply, means for pressurizing a seal, and vents, lines, orifices, conduits, valves, etc., or other means for removing and conveying pressurized air up to the at least one cavity;
- in a variant, the engine comprises an oil supply, sprinklers, or means for supplying oil to the bearing, and lines, orifices, conduits, valves, etc., or other means for removing and conveying lubrication oil up to at least one cavity;
- the fan comprises or carries an axial support on the axial retainer;
- the axial support, support means, etc., comprises an inner radial edge formed from one single part with a fan disc, or a ring returned and fixed on the fan disc.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 2:
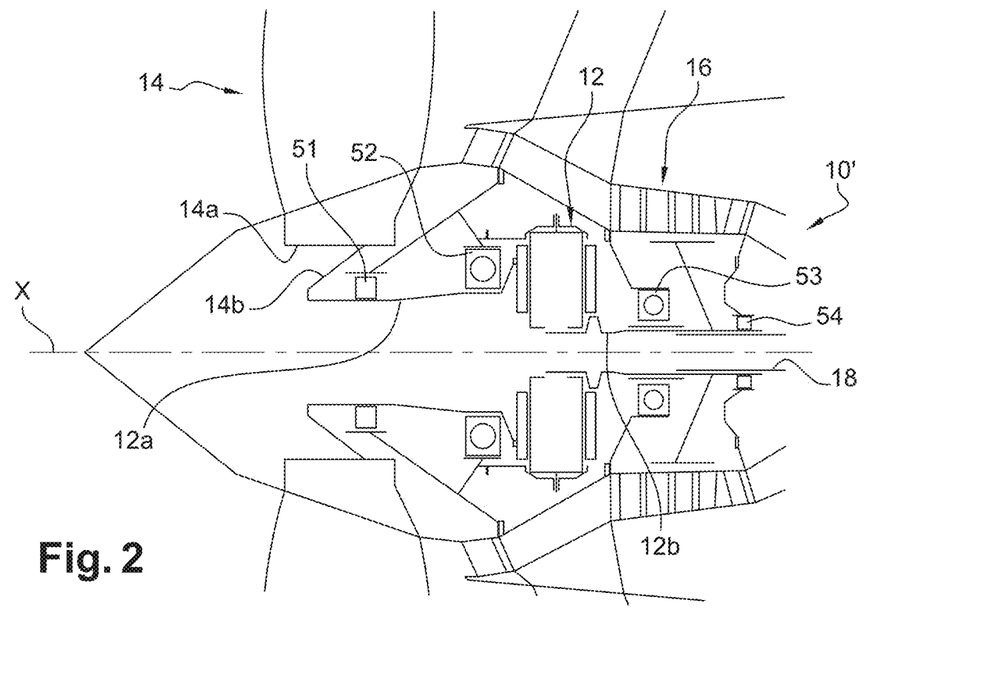
FIG. 2 is an axial schematic, cross-section view of a representative embodiment of a gas turbine engine having a reduction gear.

The engine 10' in FIG. 2 is a gas turbine engine with a reduction gear 12. Conventionally, the engine 10' comprises a fan 14 and a primary body. The primary body comprises, in the direction of gas flow, a low-pressure compressor 16, a high-pressure compressor, a combustion chamber, a high-pressure turbine, a low-pressure turbine, and a gas release nozzle, only the upstream part of the engine with the fan 14 and the low-pressure compressor 16 being visible in the drawing.

The fan 14 comprises a fan disc 14a provided with fan blades at the periphery thereof which, when they are rotated, drive the air flow into the primary and secondary flow spaces of the engine or turbojet 10'. The fan disc 14a is connected to a fan shaft 14b which is driven in rotation by an output shaft 12a of the reduction gear 12.

The output shaft 12a is tubular and comprises a downstream end, opened for the passage of a pressurised air flow (see arrow) and an upstream end, closed by a stopper 12a. The reduction gear 12 comprises an input shaft 12b driven by a shaft 18 of the low-pressure turbine. The reduction gear 12 makes it possible to independently optimise the respective rotation speeds of the fan 14 and of the rotor of the low-pressure turbine, and thus optimise the dilution ratio of the engine. In some embodiments, the reduction gear 12 is, for example, of the epicycloidal or planetary type.

The shafts of the engine are centred on the axis X by a series of bearings. In this case, the fan shaft 14a and the output shaft 12a of the reduction gear 12 are guided by two bearings, an upstream bearing 51 and a downstream bearing 52. The low-pressure shaft 18 and the input shaft 12*b* of the reduction gear are guided by two bearings, an upstream bearing 53 and a downstream bearing 54. In the embodiment shown, the bearings 51 and 54 are, for example, of the rolling type and the bearings 52 and 53 are, for example, of the ball type, and are thrust bearings in the example shown. Each bearing can be mounted in a bearing support.

Figure 3:
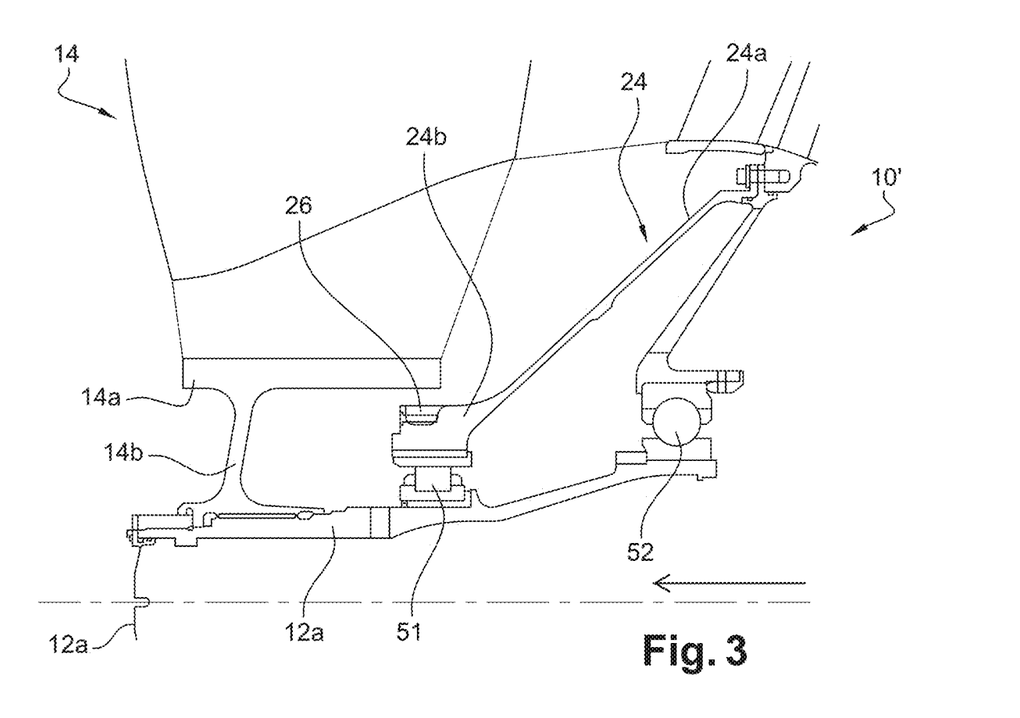
FIG. 3 is a more detailed axial schematic, cross-section half-view of an engine of the type shown in FIG. 2.

FIG. 3 shows details of the bearing supports of the bearings 51 and 52. The disclosure is applicable both to a turbine engine with a reduction gear and a turbine engine without a reduction gear. The view in FIG. 3 can thus be applied to two types of turbine engine and therefore to the two views in FIGS. 1 and 2.

The bearing support 24 of the bearing 51 comprises a truncated downstream part 24*a*, extending substantially radially towards the outside, from upstream to downstream, and an upstream cylindrical part 24*b* connected therefore to the end with a smaller diameter of the truncated part. The cylindrical part 24*b* of the bearing support 24 is surrounded by a downstream end part of the fan disc 14*a*.

Figure 6:
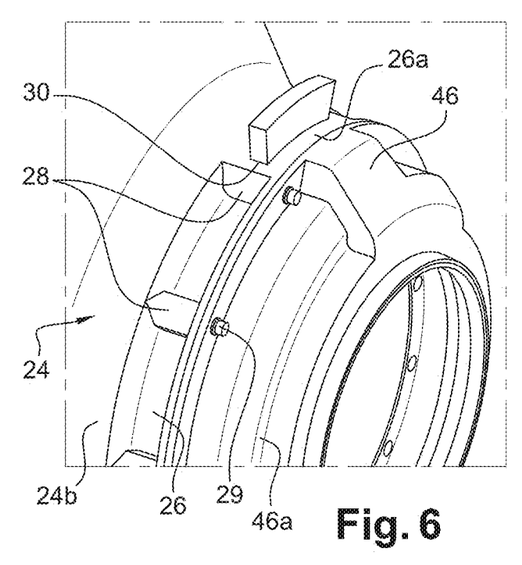
FIG. 6 is a schematic, perspective view of a stator element equipped with retention means, such as a retainer.

This cylindrical part 24*b* comprises at the outer periphery thereof, substantially opposite the fan disc 14*a*, a cavity 26, preferably annular, leading radially to the outside. The cavity 26 can continuously extend over 360° around the axis X or be interrupted and therefore sectored, as represented in FIG. 6. In FIG. 6, the cavity 26 is interrupted by bosses 28 crossed by orifices for the passage of substantially axial screws 29.

The disclosure proposes, for example, to take advantage of this cavity 26 to install therein at least one retractable axial retainer, retention means, etc., of the fan shaft 14*a*. In the example shown, one of the sectors of the cavity 26 is closed by a radially external wall 26*a* of which the radially outer face 26*aa*, for example in cylinder portion, is for example aligned with the outer cylindrical surface 24*ba* of the upstream cylindrical part 24*b* of the bearing support 24.

Figure 7:
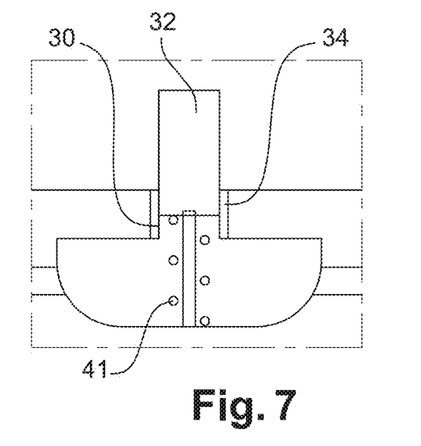
FIG. 7 is a view, similar to that in FIG. 5 and shows a representative embodiment of the sealing means of the retention means.

The wall 26*a* comprises a slot 30 for housing and sliding a retention finger 32 or other retention means. The slot 30 has an elongated shape, here in a circumferential direction around the axis X, and the finger 32 has a general parallelepiped shape of which the cross-section shape is complementary to that of the slot 30, such that the finger 32 can slide through the slot in a radial direction, substantially without any gap. Seals or other sealing means 34 are advantageously provided between the finger 32 and the peripheral edge of the slot 30 (FIG. 7).

The finger 32 is mobile from a non-operational or retracted position wherein it is housed in the cavity 26 (sector) and the radially outer end thereof is not protruding outside of the cylindrical part 24*b* of the bearing support (FIG. 4), up to an operational position wherein it is protruding over the cylindrical part of the bearing support and is configured to cooperate through axial support over a complementary means of the fan 14 and in particular, the fan shaft, in case of the latter breaking.

Figure 4:
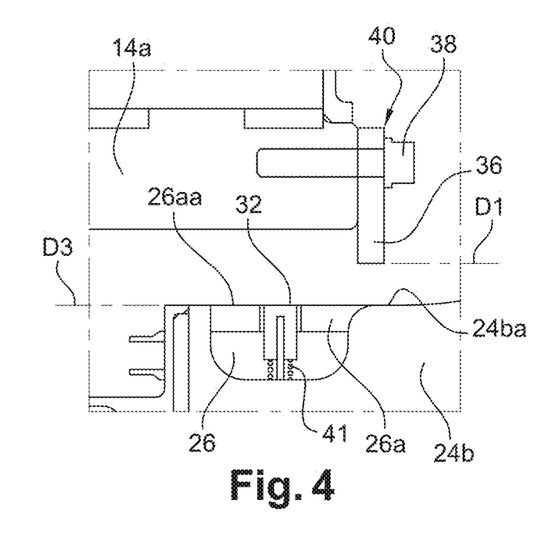
FIGS. 4 and 5 are larger-scale schematic views of a part of the engine of FIG. 2, and illustrate two positions respectively of a representative embodiment of the retainer, or retention means.
Figure 5:
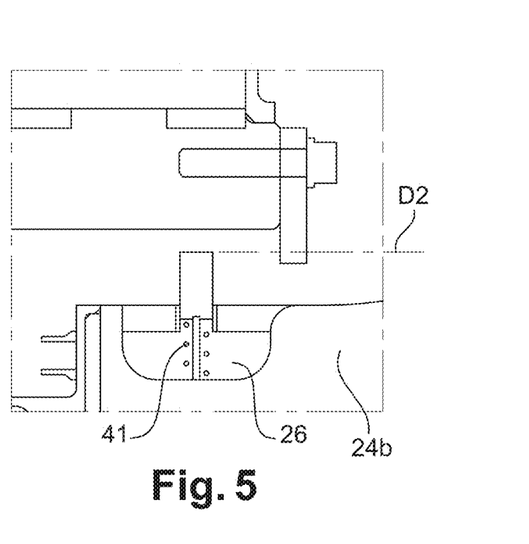

In the example described, the complementary means is an annular edge 36, which extends radially towards the inside from the outside, downstream from the fan shaft 14*a*. This edge can be obtained by returning and fixing, for example by fasteners, such as axial screws 38, a ring 40 to the downstream end of the fan shaft 14*a* (FIG. 4). This ring 40 has an inner diameter D1 less than the outer diameter D2 of the circumference, on which is situated the radially outer end of the finger 32 in the operational position. In the non-operational position, the outer diameter D3 of the circumference, on which is situated the radially outer end of the finger, which is substantially equal to the outer diameter of the cylindrical part of the bearing support, is less than the diameter D1.

The movement of the finger 32, from the non-operational position thereof to the operational position thereof, is affected using pressurized air. When the sector of cavity 26 is supplied with pressurized air at a greater value than a predetermined value, referenced P1, the finger is in the operational position thereof. Below this value (P<P1), the finger 32 remains in the non-operational position thereof. The finger 32 is biased into the non-operational position thereof by a return spring 41 or other return means, here a traction return spring. The spring 41 is mounted between the radially inner end of the finger 32 and the bottom of the cavity 26. The spring 41 can extend around a guide rod of the finger 32, rigidly connected to the bottom of the cavity 26 and housed sliding in a bore of the finger.

Figure 8:
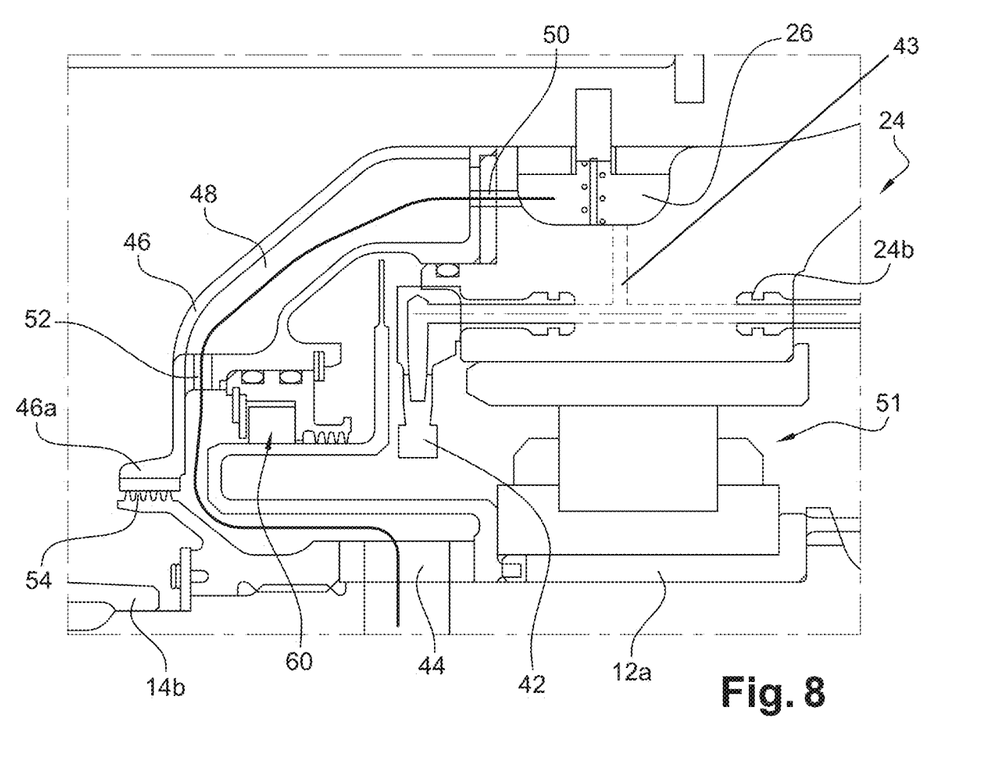
FIG. 8 is an axial schematic, cross-section and larger-scale view of a part of FIG. 3, and shows a representative embodiment of the air supply.

FIG. 8 illustrates an embodiment of the pressurized air supply, or air supply means, from the sector of cavity 26. The bearing 51 is supplied with oil by a sprinkler 42 and is housed in a pressurized chamber by pressurization means. These pressurization means comprise, in some embodiments, a circuit for the passage of compressed air, from a compressed air source, this circuit comprising, in the example represented, an orifice 44 substantially radial crossing a substantially cylindrical wall of the output shaft 12*a* of the reduction gear 12, on which is mounted the inner gasket of the bearing 51. The pressurized air heads for a SRS (segmented radial seal) type seal, indicated by reference 60 in FIG. 8, to prevent the circulation of oil through this seal and thus guarantee or substantially guarantee that oil does not leak from the chamber at the connection between rotor and stator.

The air supply, or air supply means are, for example, configured to divert some of the pressurized air from the housing chamber of the bearing 51, and guide this air into the cavity 26. Here, they comprise a flange 46 returned and fixed to the upstream end of the bearing support 24 and defining a passage 48 for diverting and guiding the pressurized air (FIGS. 6 and 8). The upstream end of the bearing support 24 comprises at least one axial orifice 50 for fluid communication between the passage 48 and the cavity 26, and at least one radial orifice 52 for fluid communication between the passage 48 and the pressurization means (e.g., orifice 44).

The flange 46 can have a substantially truncated shape, of which the downstream end with the largest diameter is fixed to the upstream end of the cylindrical wall 24*b* of the bearing support 24, and of which the downstream end with the smallest diameter can extend around a part of the output shaft 12*a* of the reduction gear 12. The flange 46 can be integral with an annular ferrule 46*a* mounted at the upstream end of the bearing support 24 and around the shaft 12*a*, as can be seen in FIG. 6. A seal 54, for example, of labyrinth type, is mounted between the output shaft 12*a* and ferrule 46*a* (see FIG. 8). This seal ensures the continuity of the air supply duct.

In another embodiment, in the case for example where the retainer or retention means comprise several fingers, regularly distributed around the axis X, the cavity could be annular without discontinuity and the flange could also be annular and define a passage that is also annular for supplying pressurized air.

Figure 9:
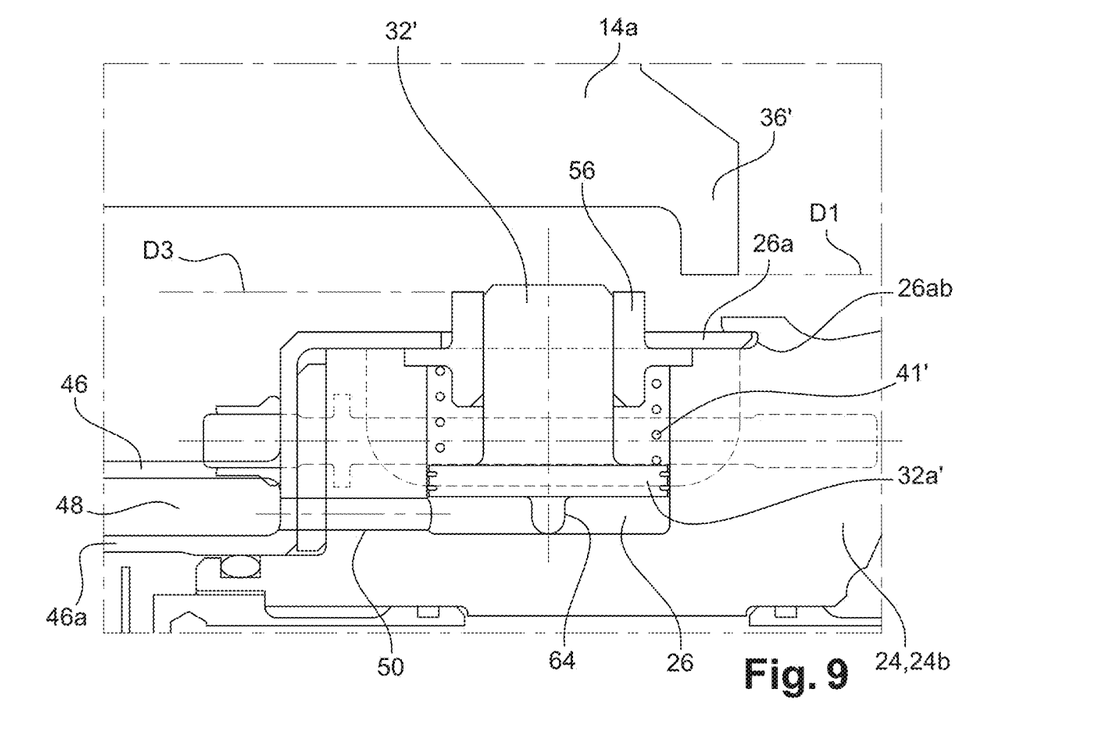
FIGS. 9 and 10 are schematic views, similar to those in FIGS. 4 and 5, respectively, and showing another embodiment of the retainer, or retention means.
Figure 10:
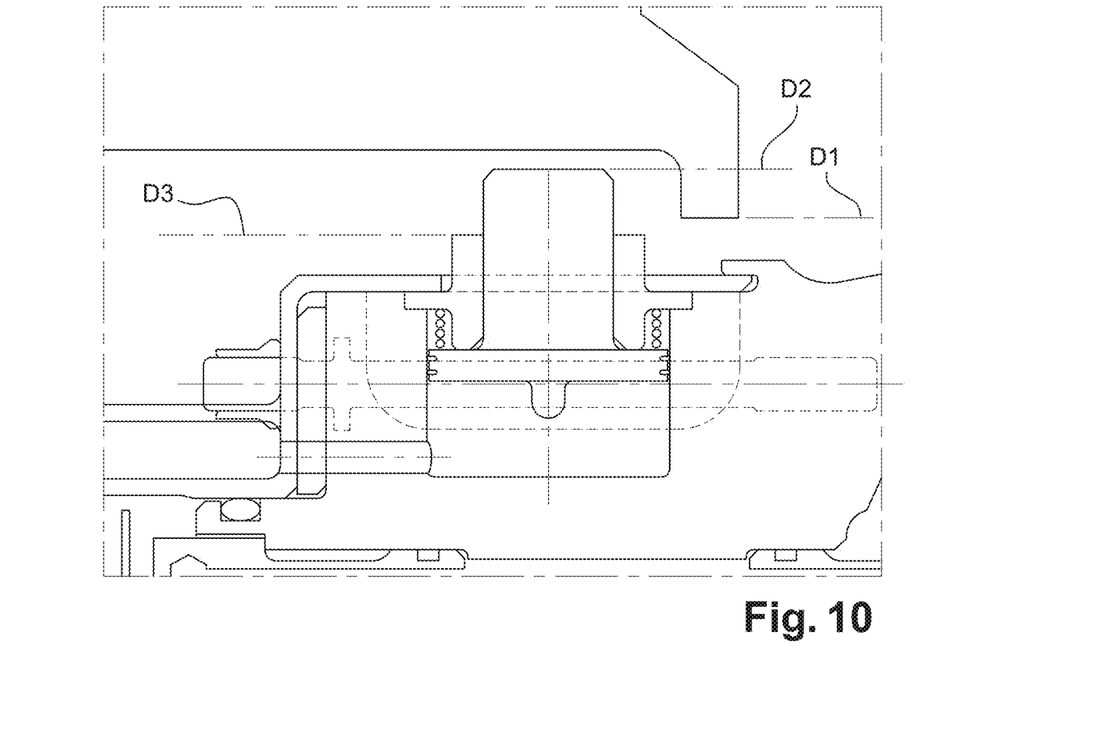

FIGS. 9 and 10 illustrate another embodiment of the retainer or retention means, which here comprises at least one cylindrical finger 32', movable from a retracted and non-operational position (FIG. 9) up to a protruding and operational position (FIG. 10).

The finger 32' is applied in the non-operational position thereof by a return spring 41', such as a compression return spring. The spring 41' is mounted between an annular edge 32a' provided at the radially inner end of the finger and the radially outer wall 26a of the cavity 26.

The functioning of the retention finger 32' is similar to that of the preceding embodiment. When the sector of cavity 26 is supplied with pressurized air at a value greater than a predetermined value, referenced P1, the finger is in the operational position thereof. Below this value (P<P1), the finger remains in the non-operational position thereof.

One or more seals or other sealing means are mounted around the finger 32', and can be configured to guide the finger during the movements thereof. The one or more seals comprise, for example, a socket 56 crossed axially by the finger 32' and comprising an annular edge interleaved between an outer peripheral edge of the cavity 26 and the above-mentioned wall 26a, which is returned on this edge. The spring 41' can be supported on this edge, as in the example represented.

Advantageously, the wall 26 is formed from one single part with the above-mentioned ferrule 46a and the flange mounted upstream from the bearing support 24 and intended to define the passage 48. The downstream peripheral edge of this wall can be engaged in an annular groove 26ab of the bearing support 24 axially leading upstream.

The finger 32' can comprise, at the radially inner end thereof, a supporting pin 64 on the bottom of the cavity 26, in the non-operational position. The pin 64 has a height or size along the axis of the finger 32', which is at least equal to the diameter of the axial orifice 50 of fluid communication between the passage 48 and the cavity 26. The finger 32', and in particular the edge 32a' thereof, does not thus risk blocking the downstream end of this orifice for supplying 50 the cavity. The edge 32a' in some embodiments is equipped with one or more seals or sealing means, such as sealing segments commonly called segment castings (two of which are shown in FIGS. 9 and 10). They are intended to cooperate with the side surface, in some embodiments cylindrical, of the cavity 26.

In some embodiments, the inner radial edge 36' provided at the downstream end of the fan disc 14a is formed from unitarily with the latter. As indicated above, the edge 36' has an inner diameter D1 less than the outer diameter D2 of the circumference on which is situated the radially outer end of the finger in the operational position (FIG. 10). In the non-operational position, the outer diameter D3 of the circumference on which is situated the radially outer end of the finger, which is substantially equal to the outer diameter of the cylindrical part 24b of the bearing support 24, is less than the diameter D1 (FIG. 9).

The gas turbine engine according to the disclosure functions as follows. Upon stopping the engine, P<P1, the return spring 41, 41' holds the finger 32, 32' in the non-operational position, which allows, for example, a holding operation by disassembling the fan (the fan is a module that can be separated from the remainder of the engine by moving upstream, for example).

When the engine functions and when P>P1, the force applied on the finger 32, 32' by the pressurized air is greater than the return force of the spring 41, 41' and the finger is in the operational position. In the fortunately barely frequent case of the shaft 12a or the bearing 52 breaking, the fan 14 is no longer axially retained upstream and is moved up to the inner edge 36, 36' of the disc thereof, axially supported on the retention finger 32, 32', which thus ensures optimal safety, even in an obstructed reduction gear type engine.

In some embodiments, one of which is schematically represented by a dotted line in FIG. 8, the cavity 26 is supplied with oil via an oil supply means or circuit 43 and no longer with pressurised air. This oil is directly removed on the oil supply circuit 43 of the bearing 51. Another embodiment of this circuit can directly lead to the bottom of the cavity 26. In this case, the environment can be simplified, since it is no longer necessary to provide means for conveying pressurised air up to the cavity 26.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A gas turbine engine, comprising a fan driven by a fan shaft and retractable axial retention means for said fan shaft mounted on a stator element and movable between a first operational position and a second non-operational position, wherein said retractable axial retention means comprises means for supplying fluid to at least one cavity wherein said retractable axial retention means is movably mounted so as to generate movement of the retractable axial retention means between said first operational position and said second non-operational position.

2. The engine according to claim 1, wherein said retractable axial retention means comprises at least one finger, movable between said positions, in a substantially radial direction with respect to an axis of rotation of said fan shaft.

3. The engine according to claim 2, wherein said at least one finger is biased into the non-operational position.

4. The engine according to claim 3, further comprising an elastic return means for biasing the at least one finger into the non-operational position.

5. The engine according to claim 1, wherein said stator element is a bearing support.

6. The engine according to claim 5, wherein said bearing support comprises a downstream truncated part and an upstream cylindrical part which surrounds a rolling bearing and comprises, at the outer periphery thereof, said at least one cavity.

7. The engine according to claim 6, wherein said upstream cylindrical part is surrounded by a downstream part of a fan disc.

8. The engine according to claim 6, further comprising means for pressurizing a seal, and means for removing and conveying pressurized air to said at least one cavity.

9. The engine according to claim 6, further comprising comprises means for supplying the roller bearing with oil, and means for removing and conveying oil to said at least one cavity.

10. The engine according to claim 1, wherein said fan comprises or carries axial support means configured to axially support said retractable axial retention means.

11. The engine according to claim 10, wherein said axial support means comprises an inner radial edge formed unitarily with a fan disc or a ring returned and fixed on said fan disc.

12. A gas turbine engine, comprising:
a fan driven by a fan shaft; and
a retractable axial retainer associated with said fan shaft and mounted for movement on a stator element, the retractable axial retainer being movable between a first operational position and a second non-operational position, wherein the retractable axial retainer comprises a fluid supply configured to supply fluid to at least one cavity in which said retractable axial retainer is mounted for movement so as to generate the movement of the retractable axial retainer between said first operational position and said second non-operational position.

13. The engine according to claim 12, wherein said retractable axial retainer is biased into the non-operational position.

14. The engine according to claim 12, wherein said stator element is a bearing support.

15. The engine according to claim 14, wherein said bearing support comprises a downstream truncated part and an upstream cylindrical part which surrounds a rolling bearing and comprises, at the outer periphery thereof, said at least one cavity.

16. The engine according to claim 15, wherein said upstream cylindrical part is surrounded by a downstream part of a fan disc.

17. The engine according to claim 15, further comprising a pressurized fluid circuit configured to pressurize a seal, and a fluid circuit configured to remove and to convey pressurized fluid to said at least one cavity.

18. The engine according to claim 15, further comprising an oil supply circuit configured to supply the rolling bearing with oil, and an oil supply circuit configured to remove and to convey oil to said at least one cavity.

19. The engine according to claim 12, wherein said fan comprises or carries an axial support configured to axially support said retractable axial retainer.

20. The engine according to claim 19, wherein said axial support comprises an inner radial edge formed unitarily with a fan disc or a ring returned and fixed on said fan disc.

\* \* \* \* \*